May 6, 1924.
A. E. ROUVIER
1,493,004
BRAKE OPERATING MECHANISM
Filed Jan. 4, 1922
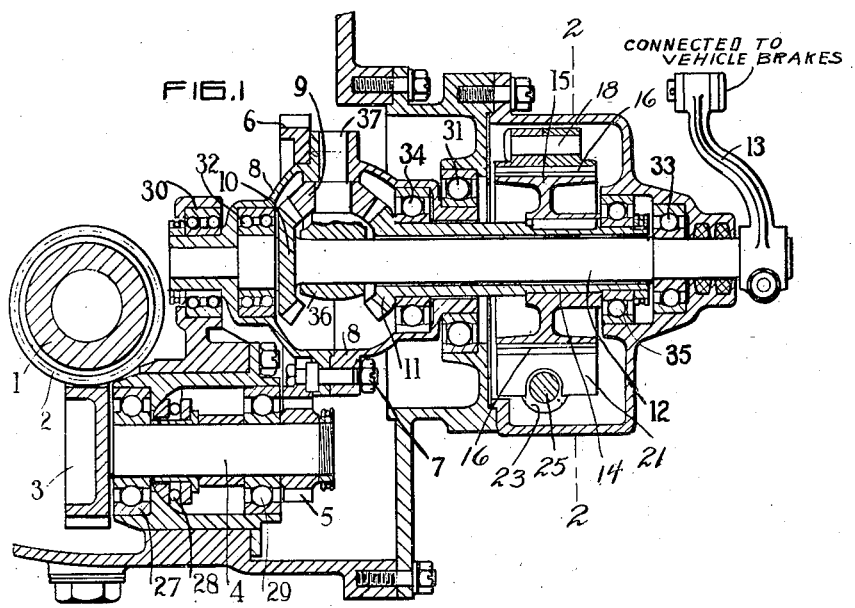
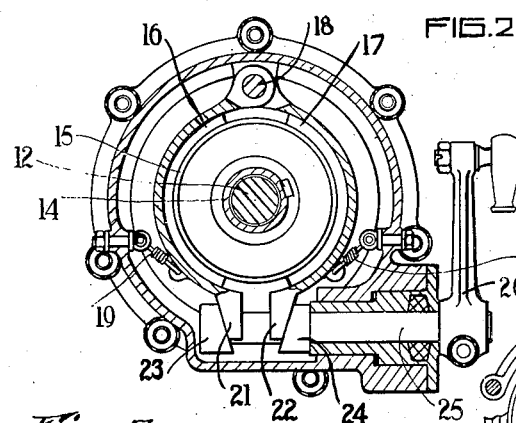
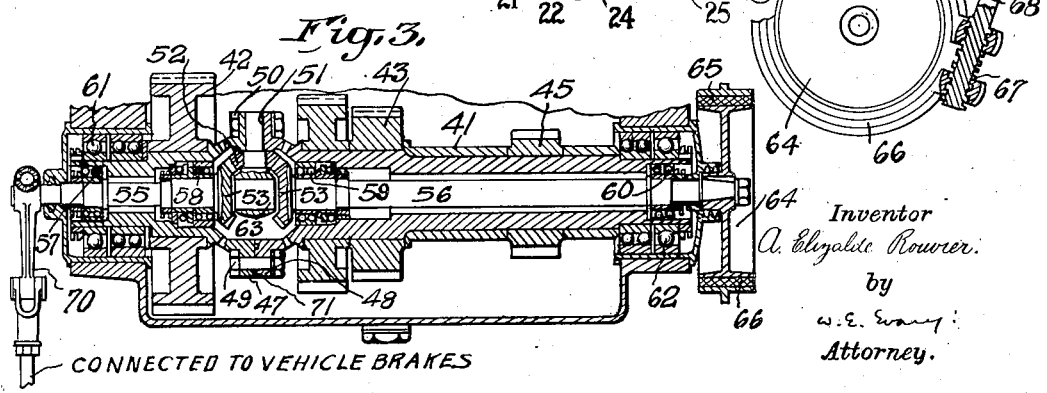
Inventor
A. Elizalde Rouvier.
by
W. E. Evans
Attorney.

Patented May 6, 1924.

1,493,004

UNITED STATES PATENT OFFICE.

ARTURO ELIZALDE ROUVIER, OF BARCELONA, SPAIN.

BRAKE-OPERATING MECHANISM.

Application filed January 4, 1922. Serial No. 527,032.

*To all whom it may concern:*

Be it known that I, ARTURO ELIZALDE ROUVIER, a subject of the King of Spain, residing at Barcelona, Spain, have invented certain new and useful Brake-Operating Mechanism, of which the following is a specification.

In high speed motor vehicles as well as in heavy motor vehicles such as lorries, busses and the like, the development of motive power during the run is so considerable that it is often impossible for the driver to effectively apply the brake with the speed necessary having regard to the amount of muscular force necessary to effect this operation.

The present invention has for its object to avoid this disadvantage by means in which the braking of the vehicle is effected by the action of the motor itself, the driver intervening only with the muscular effort necessary to determine the actuation of the brake through the motor.

The invention comprises a differential mechanism formed of two planetary toothed wheels and a number of satellite pinions which gear therewith, the casing or support of the satellite pinions being operated by the motor of the vehicle by means of a suitable transmission. One of the planetary wheels is mounted solid with the brake operating shaft and the other is provided with a member which is engaged by the driver when it is desired to brake the vehicle in order that in arresting the movement of the corresponding planetary wheel, the other is obliged to move and cause the operation of the brake.

The invention is illustrated in the accompanying drawing by way of example. In the drawing Figure 1 is a longitudinal section of the mechanism, Figure 2 is a section in a plane which passes through the line 2—2 of Figure 1. Figures 3 and 4 represent a modification in construction.

As illustrated in Figures 1 and 2 of the accompanying drawings, 1 represents the intermediate spindle of the casing of the speed changing gear of an automobile, which spindle is in movement during the operation of the motor. This spindle 1 transmits its movement to another spindle 4 by means of the helicoidal gears 2, 3. The spindle 4 carries solid with it a pinion 5 gearing with a toothed crown 6 fixed by means of bolts such as 7 to the casing 8 of a differential which is composed of three toothed pinions such as 9 which act as satellites and these have their spindles 37 carried by the casing 8 and connected to form a single star-like member, the boss 36 of which is free to turn upon the spindle 12 of the planetary wheel 10, and two planetary toothed bevel wheels 10 and 11, the first of which is solid with the spindle 12 to which is fixed the lever 13 connected with the brake operating lever and the second 11 is solid with a tubular spindle 14 upon which is fixed the pulley 15 serving as a brake drum which is braked by the driver as hereinafter described in order thus to effect the consequent braking of the vehicle.

The brake of the drum or pulley 15 is constituted in the manner indicated in Figure 2 by two segments 16 and 17, pivoted upon a spindle 18 and constantly influenced for separation from the pulley 15 by springs 19 and 20. The said segments terminate in stops 21 and 22 which with the rings 23 and 24 integrally formed with the spindle 25 constitute a system of wedges disposed in such manner that the rotation of the spindle 25 causes the mutual approach of the stops 21 and 22 and consequently the application of the segments 16 and 17 against the surface of the drum 15, by which the movement of rotation of the drum is arrested.

The spindle 25 has securely fixed to it a lever 26 jointed with a set of elements operated by the driver of the vehicle for causing at will the braking of the latter.

The rotary elements of the described mechanism in their principal parts are mounted upon ball bearings which are represented in the drawing, Figure 1, the numbers 27, 28 and 29 corresponding to the mounting of the spindle 4, the numbers 30 and 31 to the rotary casing 8 of the differential, 32 and 33 to the planetary 10, and 34 and 35 to the other planetary 11.

The operation of the mechanism is effected in the following manner:

All the elements being disposed in the position represented in the drawing, that is to say the brake of the vehicle being in the inoperative position, the segments 16 and 17 separated from the surface of the pulley and the motor being supposed to be running, the resistance opposed to the movement through the inertia of the operating elements of the brake, is sufficient for preventing rotation of the planetary wheel 10. The satellite pinions 9 subject to the action of the toothed crown 6 roll upon this planetary wheel in turning about the spindle 12 upon which is freely mounted, as has been hereinbefore described, the boss 36 of the spindles of the satellites 9. In this movement the planetary wheel 11 turns with the pulley 15.

This operation will continue in the same way so long as the driver of the vehicle does not wish to apply the brake but as soon as he desires to do so he will operate the brake lever 26 and cause the turning of the spindle 25. The wedges 23 and 24 will then oblige the segments 16 and 17 to grip the pulley or drum 15 and then the planetary wheel 11 will tend to be immobilized. Thus the satellite pinions 9 will put in movement the planetary wheel 10; the spindle 12 and the lever 13 will tend to turn and the brake operating members of the vehicle, with which the lever 13 is in mechanical connection, will enter into activity.

Consequently the braking of the vehicle is effected by its motor and the action of the driver is reduced to effect only such work as is necessary to bring the motor into operation. Thus an effective and energetic operation of the brake is ensured with a relatively small effort on the part of the driver.

In the modification of the mechanism represented in Figures 3 and 4, the characteristic feature is indicated that the differential corresponding to the motor is placed in the interior of the intermediate spindle of the gear changing mechanism. For this purpose the intermediate spindle which has a central hollow bore is provided with a sort of casing formed by two half parts by which the supports or spindles of the satellites of the differential are carried, the planetary wheels being mounted upon two spindles mounted in the central bore of the intermediate spindle. One of the planetary wheels is in relation with the arrangement producing the braking of the wheels of the vehicle and the other with the operating elements to cause the operation of the brake.

Figure 3 is a longitudinal section and Figure 4 is a side view of the pulley which causes the braking, with the section of the endless screw for the operation of the brake segments which act at the opportune moment upon the said pulley.

The intermediate spindle of the speed changing gear is represented at 41, and it comprises two parts jointed at 71 and forming a cavity. It carries secured to it the toothed wheels 42, 43, 44 and 45 corresponding to the gear changing mechanism aforesaid. The hollow body is formed with the two half parts 47 and 48 connected together by means of bolts such as 49, 50, the casing thus formed serving to carry the spindles such as 51 of the satellites 52 of the differential, whose planetary wheels are indicated 53 and 54 and are mounted respectively upon two spindles 55 and 56 which are mounted in the bore of the intermediate spindle 41. Between the interior spindles 55, 56 and the intermediate spindle 41, are disposed ball bearings 57, 58, 59, 60, and this intermediate spindle rotates also upon ball bearings 61, 62. The spindles 51 of the satellites 52 are connected together by a boss 63.

The interior spindle 56 carries fixed to its extremity the pulley 64 by means of which the braking is caused and upon which operate at the opportune moment the segments 65, 66 which are moved for their operation by means of an endless screw 67 and operated by the spindle 68 and the lever 69 controlled by the driver. The interior spindle 55 carries fixed upon it the lever 70 which operates the actual braking members of the vehicle.

When the driver operates the lever 69 for braking the pulley 64 by means of the segments 65, 66, the planetary wheel 54 tends to remain fixed and the movement of the satellites 52 determines the relation of the planetary 53 and the spindle 55. This latter causes the lever 70 which is fixedly mounted upon the spindle 55 to turn. This produces the operation of the braking mechanism of the wheels of the vehicle by means of the mechanical action of the motor thereof which when it is running causes the hollow spindle 41 to turn and causes the rotation of the satellites which are mounted upon the supports or spindle solid with the casing 47, 48 which as before described forms part of the hollow spindle 41.

It will thus be understood that the mechanism of this modification is placed in the interior of the intermediate spindle of the speed changing gear and that this is effected in a simple and practical way.

It will also be understood that the mechanism described admits of modifications in form and disposition of the respective parts without departing from the essential features of the invention.

I claim:

1. Brake operating mechanism for vehicles, comprising a differential gear consisting of two planetary wheels and a plurality of statellite pinions, a rotatable carrier for said satellite pinions, gears for transmitting movement from the vehicle motor to the said carrier, one of the said planetary wheels being secured upon the brake operating spindle of the vehicle, and an element for arresting the movement of the other planetary wheel, the said element being integral with the said wheel and operated by the driver.

2. Brake operating mechanism for vehicles, comprising a differential gear consisting of two planetary wheels and a plurality of satellite pinions, a rotatable carrier for the said satellite pinions, said carrier being integral with a spindle of the change speed gear of the vehicle, one of said planetary wheels being fixed to the brake operating spindle of the vehicle, and a braking element controlled by the driver, said braking element being connected with the second planetary wheel.

3. In brake operating mechanism for vehicles as set forth in claim 2, the rotatable carrier for the satellite pinions comprised by two parts, said parts being integral respectively with corresponding parts of the spindle of the change speed gear, and means for securing the said parts of the rotatable carrier together.

ARTURO ELIZALDE ROUVIER.